US012604860B2

(12) United States Patent
Song

(10) Patent No.: US 12,604,860 B2
(45) Date of Patent: Apr. 21, 2026

(54) MOUNTING BASE FOR CAT FURNITURE DEVICE AND CAT FURNITURE DEVICE

(71) Applicant: ZIEL HOME FURNISHING TECHNOLOGY CO., LTD., Zhengzhou (CN)

(72) Inventor: Chuan Song, Zhengzhou (CN)

(73) Assignee: ZIEL HOME FURNISHING TECHNOLOGY CO., LTD., Zhengzhou (CN)

( * ) Notice: Subject to any disclaimer, the term of this patent is extended or adjusted under 35 U.S.C. 154(b) by 149 days.

(21) Appl. No.: 18/356,379

(22) Filed: Jul. 21, 2023

(65) Prior Publication Data

US 2024/0107977 A1 Apr. 4, 2024

Related U.S. Application Data

(63) Continuation of application No. PCT/CN2023/083329, filed on Mar. 23, 2023.

(30) Foreign Application Priority Data

Sep. 30, 2022 (CN) .......................... 202222649806.6
Nov. 28, 2022 (CN) .......................... 202223200176.0

(51) Int. Cl.
*A01K 1/035* (2006.01)

(52) U.S. Cl.
CPC .................................... *A01K 1/035* (2013.01)

(58) Field of Classification Search
CPC ...... A01K 15/02; A01K 15/024; F16M 13/02; F16B 21/09; F16B 12/22; F16B 12/34
(Continued)

(56) References Cited

U.S. PATENT DOCUMENTS 2,264,243 A * 11/1941 Knuth ..................... F16B 12/34
52/282.4
2,925,181 A * 2/1960 Saul, Jr. ................. A47B 57/40
211/191
(Continued)

FOREIGN PATENT DOCUMENTS

CN        108770720 A      11/2018
CN        210004252 U       1/2020
(Continued)

OTHER PUBLICATIONS

CN 216475782 U Machine translation (Year: 2024).*

*Primary Examiner* — Jack W Keith
*Assistant Examiner* — Hae Rie Jessica Byun
(74) *Attorney, Agent, or Firm* — Westbridge IP LLC

(57) ABSTRACT

Disclosed are a mounting base and a cat furniture device. The mounting base includes: a fixing plate, a plurality of pins, a mounting plate, and a plurality of connecting members. The plurality of pins are located on a side of the fixing plate, and fixed to the fixing plat. The mounting plate is located at an end of the fixing plate, and fixed to the end of the fixing plate, and configured to be fixed to the support. The plurality of connecting members are configured to be fixed to the cat furniture item. The pins are configured to be snapped with the connecting members respectively to fix the cat furniture item to the mounting base. This configuration can reduce the risk of the cat furniture item being damaged during detaching the cat furniture item from the wall surface.

14 Claims, 9 Drawing Sheets

(58) Field of Classification Search
USPC ..... 52/27, 36.5; 248/346.04, 223.41, 222.41, 248/235, 346.03, 205.1, 220.2
See application file for complete search history.

(56) References Cited

U.S. PATENT DOCUMENTS

| | | | | | |
|---|---|---|---|---|---|
| 3,045,834 | A | * | 7/1962 | Seiz | A47B 47/03 |
| | | | | | 211/182 |
| 3,455,528 | A | * | 7/1969 | Meyer | F16L 3/13 |
| | | | | | 24/339 |
| 3,905,712 | A | * | 9/1975 | McConnell | F16B 5/065 |
| | | | | | 211/208 |
| 3,986,318 | A | * | 10/1976 | McConnell | F16B 12/34 |
| | | | | | 403/384 |
| 4,258,464 | A | * | 3/1981 | Ullman, Jr. | B27F 1/00 |
| | | | | | 403/353 |
| 4,271,999 | A | * | 6/1981 | Stravitz | G10G 5/00 |
| | | | | | 24/666 |
| 4,470,716 | A | * | 9/1984 | Welch | F16B 12/38 |
| | | | | | 248/221.12 |
| 4,593,159 | A | * | 6/1986 | Charchanko | H04M 1/02 |
| | | | | | 379/428.01 |
| 5,052,846 | A | * | 10/1991 | Behshid | E04H 17/163 |
| | | | | | 403/294 |
| 5,653,349 | A | * | 8/1997 | Dana | F16B 12/34 |
| | | | | | 248/221.12 |
| 5,716,154 | A | * | 2/1998 | Miller | B62D 27/065 |
| | | | | | 403/22 |
| 5,738,020 | A | * | 4/1998 | Correia | E05G 1/005 |
| | | | | | 109/51 |
| 5,749,241 | A | * | 5/1998 | Ryu | F16B 5/0036 |
| | | | | | 62/340 |
| 6,196,758 | B1 | * | 3/2001 | Scarborough | F16B 21/09 |
| | | | | | 403/379.2 |
| 9,711,431 | B2 | * | 7/2017 | Lin | H01L 23/4006 |
| 10,881,200 | B2 | * | 1/2021 | Feldman | A01K 1/035 |
| 11,330,920 | B1 | * | 5/2022 | Rogers | G09F 7/02 |
| 11,353,055 | B2 | * | 6/2022 | Shih | F16B 39/284 |
| 2007/0215780 | A1 | * | 9/2007 | Eichert | A47G 1/162 |
| | | | | | 248/497 |
| 2010/0193455 | A1 | * | 8/2010 | Russell | A47B 81/064 |
| | | | | | 211/90.04 |
| 2010/0288891 | A1 | * | 11/2010 | Tisbo | A47F 5/0853 |
| | | | | | 248/201 |
| 2014/0284962 | A1 | * | 9/2014 | Mally | B60R 13/0243 |
| | | | | | 296/146.7 |
| 2017/0258249 | A1 | * | 9/2017 | Kim | A47F 5/08 |
| 2018/0103613 | A1 | * | 4/2018 | Voronenko | A01K 15/024 |
| 2019/0021284 | A1 | * | 1/2019 | Feldman | A47B 47/047 |
| 2019/0274277 | A1 | * | 9/2019 | Wilson | F16B 5/0614 |
| 2021/0071699 | A1 | * | 3/2021 | Bastian | F16B 12/22 |
| 2023/0069026 | A1 | * | 3/2023 | Tuthill | A01K 15/024 |

FOREIGN PATENT DOCUMENTS

| | | | | | |
|---|---|---|---|---|---|
| CN | 215346456 | U | | 12/2021 | |
| CN | 216475782 | U | * | 5/2022 | |
| CN | 114601313 | A | | 6/2022 | |
| DE | 10228755 | A1 | * | 1/2004 | H04M 1/0297 |
| DE | 102016221145 | A1 | * | 5/2018 | |
| EP | 1961331 | A1 | | 8/2008 | |
| GB | 2293857 | A | * | 4/1996 | A61G 7/1078 |
| JP | 3217778 | U | | 8/2018 | |

* cited by examiner

Top ←————————→ Bottom

Top ←————————→ Bottom

MOUNTING BASE FOR CAT FURNITURE DEVICE AND CAT FURNITURE DEVICE

CROSS-REFERENCE TO RELATED APPLICATIONS

The present application is a continuation of International Application No. PCT/CN2023/083329, filed on Mar. 23, 2023, which claims priority to Chinese Patent Application No. CN202222649806.6, filed on Sep. 30, 2022 and Chinese Patent Application No. CN202223200176.0, filed on Nov. 28, 2022. The disclosures of the aforementioned applications are hereby incorporated by reference in their entireties.

TECHNICAL FIELD

The present disclosure relates to the field of pet supplies technologies, and in particular, to a mounting base for a cat furniture device and a cat furniture device.

BACKGROUND

With the development of technology and an increase in consumer demand, a wide variety of a cat furniture item appears, such as a cat platform, a cat column plate, a cat nest, a cat ladder, a cat feed bowl, a cat hammock, a cat bridge, etc. Due to good activity of a cat, such a cat furniture item often needs to be fixed on a wall surface, to be provided for a cat to play.

Most traditional cat furniture items are fixed to the wall surface through a screw, so that the cat furniture items may be ensured to be firmly fixed on the wall surface. However, when a cat furniture item needs to be carried to another place, the cat furniture item needs to be detached from the wall surface, and when the screw is disassembled, the cat furniture item is often damaged, and subsequent use of the cat furniture item is affected.

SUMMARY

In view of this, in order to solve a problem in the prior art, the present disclosure provides a mounting base for a cat furniture device, and a technical problem to be solved by the present disclosure is: how to fix a cat furniture item on a wall surface, to prevent the cat furniture item from being damaged during disassembly.

According to a mounting base for a cat furniture device provided by the present disclosure, the cat furniture device includes the mounting base and a cat furniture item, the mounting base is configured to fix the cat furniture item to a support, and the mounting base includes a fixing plate, a plurality of snap-fit members, a mounting plate, and a plurality of connecting members. The plurality of snap-fit members are located on a side of the fixing plate, and fixed to the fixing plate; the mounting plate is located at an end of the fixing plate, and fixed to the end of the fixing plate, and the mounting plate is configured to be fixed on the support; and the plurality of connecting members are configured to be fixed to the cat furniture item, wherein the plurality of snap-fit members are configured to be detachably snapped with the plurality of connecting members respectively, so as to fix the cat furniture item to the mounting base.

In an exemplary embodiment, the plurality of snap-fit members are configured to be a plurality of pins.

In an exemplary embodiment, according to the mounting base provided by the present disclosure, each pin is an inverted cone having a gradually expanding diameter in a direction away from the fixing plate; each connecting member is provided with a snapping slot, and the snapping slot includes a first circular slot section, a second circular slot section, and a transition channel section located between the first circular slot section and the second circular slot section; the second circular slot section is an inverted cone having a gradually expanding diameter from a bottom thereof to a top thereof, a diameter of the bottom of the second circular slot section is less than a diameter of a top of a corresponding pin, and a diameter of the top of the second circular slot section is greater than the diameter of the top of the corresponding pin; the corresponding pin is capable of being inserted into the first circular slot section, and is capable of moving, along the transition channel section, from the first circular slot section to the second circular slot section, so as to be snapped with the second circular slot section.

In an exemplary embodiment, according to the mounting base provided by the present disclosure, a diameter of the first circular slot section is greater than the diameter of the top of the corresponding pin, so that the corresponding pin is capable of being inserted into the first circular slot section.

In an exemplary embodiment, according to the mounting base provided by the present disclosure, two side walls of the transition channel section are obliquely arranged, so that a width of a bottom of the transition channel section is less than the diameter of the top of the corresponding pin, and a width of a top of the transition channel section is greater than the diameter of the top of the corresponding pin.

In an exemplary embodiment, according to the mounting base provided by the present disclosure, a side wall of the snapping slot is provided, at a joint of the second circular slot section and the transition channel section, with a protruding portion protruding towards an opposite side wall of the snapping slot, so that a width, at the joint, of the snapping slot is less than a width of the second circular slot section and a width of the transition channel section.

In an exemplary embodiment, according to the mounting base provided by the present disclosure, the snapping slot further includes an extension portion, and the extension portion is located on a side, away from the transition channel section, of the second circular slot section, so that the protruding portion is squeezed by the corresponding pin and easily deformed, when the corresponding pin passes through the joint.

In an exemplary embodiment, according to the mounting base provided by the present disclosure, each pin includes a small-diameter portion and a large-diameter portion, and the small-diameter portion and the large-diameter portion are sequentially arranged in a direction away from the fixing plate; each connecting member is provided with a snapping slot, and the snapping slot includes a first circular slot section, a second circular slot section, and a transition channel section located between the first circular slot section and the second circular slot section; the second circular slot section includes a small-diameter segment and a large-diameter segment, and the small-diameter segment and the large-diameter segment are sequentially arranged in a direction from a bottom of the second circular slot section to a top of the second circular slot section; a diameter of the small-diameter portion is less than a diameter of the small-diameter segment; a diameter of the large-diameter portion is greater than the diameter of the small-diameter segment, and less than a diameter of the large-diameter segment; and a corresponding pin is capable of being inserted into the first circular slot section, and is capable of moving, along the transition channel section, from the first circular slot section to the second circular slot section, so as to be snapped with the second circular slot section.

In an exemplary embodiment, according to the mounting base provided by the present disclosure, a diameter of the first circular slot section is greater than the diameter of the large-diameter segment, so that the corresponding pin is capable of being inserted into the first circular slot section.

In an exemplary embodiment, according to the mounting base provided by the present disclosure, the transition channel section includes a narrow segment and a wide segment, the narrow segment and the wide segment are sequentially arranged in a direction from a bottom of the transition channel section to a top of the transition channel section; and the diameter of the small-diameter portion is less than a width of the narrow segment; the diameter of the large-diameter portion is greater than the width of the narrow segment, and less than a width of the wide segment.

In an exemplary embodiment, according to the mounting base provided by the present disclosure, a side wall of the snapping slot is provided, at a joint between the second circular slot section and the transition channel section, with a protruding portion protruding towards an opposite side wall of the snapping slot, so that a width, at the joint, of the snapping slot is less than a width of the second circular slot section and a width of the transition channel section.

In an exemplary embodiment, according to the mounting base provided by the present disclosure, each connecting member is further provided with a weakening portion, the weakening portion includes a weakening slot or a weakening hole, and the weakening portion is adjacent to the protruding portion, so that when the corresponding pin passes through the joint, the protruding portion is easily deformed by being squeezed by the corresponding pin.

In an exemplary embodiment, according to the mounting base provided by the present disclosure, the fixing plate is provided, on a side where the plurality of pins are located, with an auxiliary ramp, the auxiliary ramp is located at a joint of the fixing plate and the mounting plate, and the auxiliary ramp is configured to gradually rise towards the fixing plate.

In an exemplary embodiment, according to the mounting base provided by the present disclosure, the mounting base further includes a pair of cushions, the pair of cushions and the plurality of pins are located on the same side of the fixing plate, the pair of cushions are fixed to the fixing plate, and the pair of cushions extend along a length direction of the fixing plate, and the pair of cushions are arranged at intervals.

In an exemplary embodiment, according to the mounting base provided by the present disclosure, the mounting plate is provided with a plurality of oblong holes, and each oblong hole is configured to allow a fastener to pass through, to fix the mounting plate to the support.

In an exemplary embodiment, according to the mounting base provided by the present disclosure, the mounting plate is substantially perpendicular to the fixing plate.

In an exemplary embodiment, according to the mounting base provided by the present disclosure, the mounting base further includes a reinforcing rib, and the reinforcing rib is arranged on a side, facing away from the plurality of pins, of the fixing plate, and is fixed to the fixing plate.

In an exemplary embodiment, according to the mounting base provided by the present disclosure, the mounting base further includes a lower cover plate, the lower cover plate is located on the side, facing away from the plurality of pins, of the fixing plate, and the lower cover plate covers a side surface on the side, facing away from the plurality of pins, of the fixing plate.

In an exemplary embodiment, according to the mounting base provided by the present disclosure, the mounting base further includes a hollow column fixed to the mounting plate, the hollow column is located on the side, facing away from the plurality of pins, of the fixing plate, and is located on a side, where the fixing plate is located, of the mounting plate; a connecting portion is disposed at an end of the lower cover plate, the connecting portion is provided with a through hole; the hollow column is configured to pass through the through hole, and is configured to allow a fastener, fixed to the support, to pass through.

In an exemplary embodiment, according to the mounting base provided by the present disclosure, the mounting base further includes a support plate, the support plate is located on the side, facing away from the plurality of pins, of the fixing plate, and is located at a corner of the fixing plate and the mounting plate, and the support plate includes a first support portion and a second support portion; the first support portion is fixed to the fixing plate, and is configured to extend, in a direction away from the mounting plate, from the mounting plate; and the second support portion is fixed to the mounting plate, and is configured to extend from the fixing plate to the hollow column, and be fixed to the hollow column.

In an exemplary embodiment, according to the mounting base provided by the present disclosure, the mounting base further includes a reinforcing rib, the reinforcing rib is arranged on the side, facing away from the plurality of pins, of the fixing plate, and is fixed to the fixing plate, the lower cover plate is further provided with a receiving slot matching a shape of the reinforcing rib, and the reinforcing rib is configured to be inserted into the receiving slot.

In an exemplary embodiment, according to the mounting base provided by the present disclosure, the mounting base further includes an upper cover plate, a plurality of connecting portions are fixed to the upper cover plate, wherein the upper cover plate is configured to be fixed to the cat furniture item, so that the plurality of connecting members are fixed to the cat furniture item by means of the upper cover plate.

In an exemplary embodiment, according to the mounting base provided by the present disclosure, the upper cover plate is provided with a plurality of concave portions, and each connecting member is embedded in a corresponding concave portion.

According to a second aspect, the present disclosure provides a cat furniture device, wherein the cat furniture device includes a cat furniture item; and a mounting base according to any one of above embodiments, configured to fix the cat furniture item to a support.

Compared with the prior art, the present disclosure has following advantages:

the cat furniture item is fixed, through the mounting base provided by the present disclosure, to a wall surface, so that the cat furniture item is prevented from being directly fixed to the wall surface; during disassembly, the cat furniture item may be detached from the wall surface by simply withdrawing the connecting members on upper cover assembly from the pins, and then removing a panel from the pins, so that the cat furniture item is effectively prevented from being damaged.

BRIEF DESCRIPTION OF THE DRAWINGS

The above and/or additional aspects and advantages of the present disclosure become apparent and readily appreciated with following description of embodiments in conjunction with accompanying drawings.

DETAILED DESCRIPTION OF THE EMBODIMENTS

In order to more clearly understand the above-mentioned objects, features, and advantages of the present disclosure, the present disclosure is further described in detail below with reference to accompanying drawings and specific embodiments. It should be noted that, in the case of no conflict, the embodiments of the present disclosure and the features in the embodiments may be combined with each other.

Numerous specific details are set forth in following description to facilitate a thorough understanding of the present disclosure, however, the present disclosure may also be implemented in other manners different from that described herein. Therefore, the scope of protection of the present disclosure is not limited by the specific embodiments disclosed below.

Following is a further description of technical solutions of the present disclosure in conjunction with the accompanying drawings, but the present disclosure is not limited to these embodiments.

It should be noted that the mounting base is configured to fix a cat furniture item on a wall, and the cat furniture item includes a cat platform, a cat column plate, a cat nest, a cat ladder, a cat feeding bowl, a cat hammock, a cat bridge, and the like.

Figure 16:
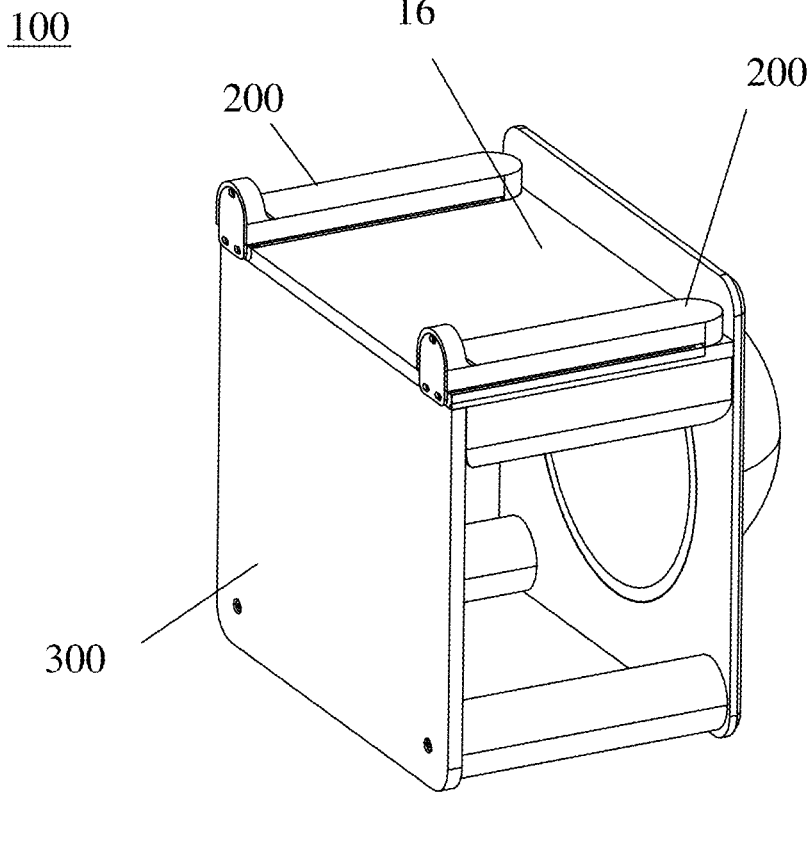
FIG. 16 is a schematic structural diagram of a cat furniture device according to an embodiment of the present disclosure.

As shown in FIG. 16, a cat furniture device 100 includes a mounting base 200 and a cat furniture item 300, the mounting base 200 is detachably mounted on the cat furniture item 300, and is configured to fix the cat furniture item 300 to a support, in an example, the support includes, but is not limited to, hard surfaces such as a wall, a furniture surface, a ceiling, and a ground, etc.

Exemplary Mounting Base

Figure 1:
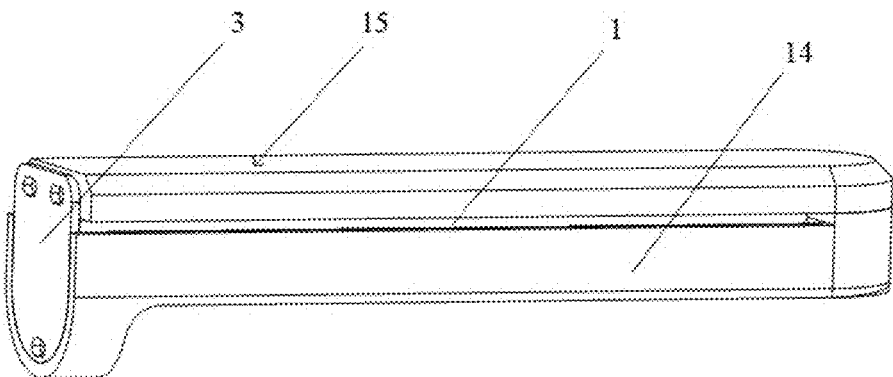
FIG. 1 is a schematic structural diagram of a mounting base for a cat furniture device according to an embodiment of the present disclosure.
Figure 2:
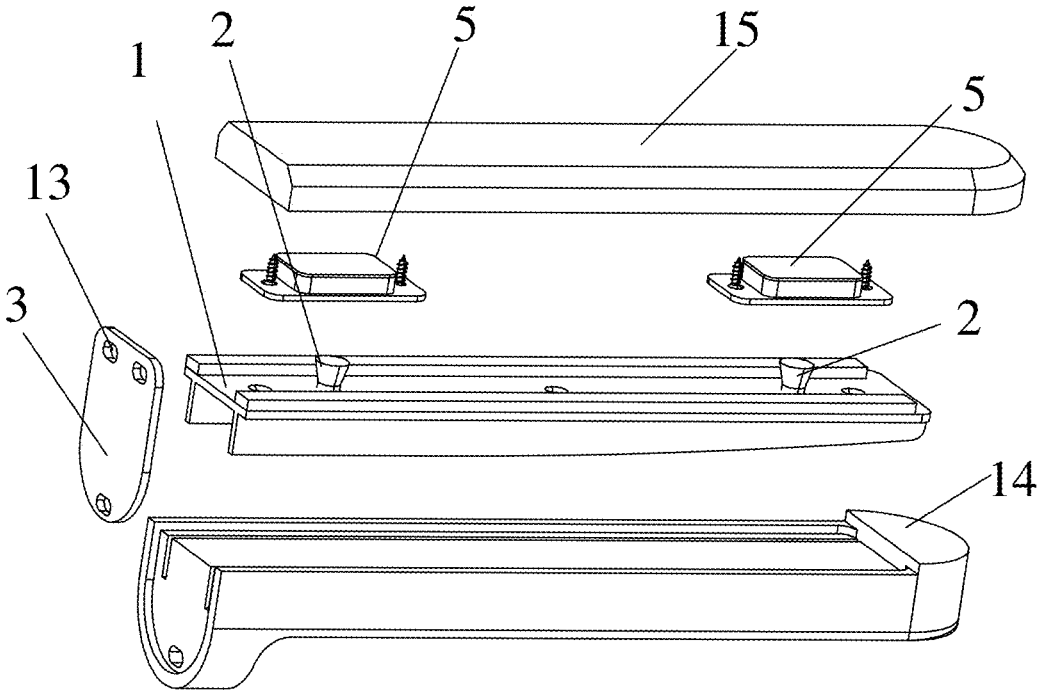
FIG. 2 is a schematic exploded diagram of the mounting base for the cat furniture device of the embodiment shown in FIG. 1.

As shown in FIG. 1 and FIG. 2, a mounting base in an embodiment includes a fixing plate 1, a plurality of snap-fit members 2, a mounting plate 3, and a plurality of connecting members 5. The plurality of snap-fit members 2 are located on a side of the fixing plate 1, and fixed to the fixing plate 1, in some examples, a plurality of snap-fit members 2 may be two or more, and the number of the snap-fit members 2 may be appropriately increased or decreased as required; the mounting plate 3 is located at an end of the fixing plate 1, and fixed to the end of the fixing plate 1, and the mounting plate 3 is configured to be fixed on a support, wherein the mounting plate 3 may be adapted to a surface of the support; the plurality of connecting members 5 are configured to be fixed to the cat furniture item 300, wherein the plurality of snap-fit members 2 are configured to be detachably snapped with the plurality of connecting members 5 respectively, to fix the cat furniture item 300 to the mounting base 200, that is, the plurality of connecting members 5 are in one-to-one correspondence with the plurality of snap-fit members 2. In an example, cat furniture device 100 includes at least two mounting bases 200.

In an example, a plurality of snap-fit members 2 are configured to be a plurality of pins 2. That is, a snap-fit member 2 may have a shape similar to a shape of a pin. Of course, in other examples, a snap-fit member 2 may be configured in other shapes. It should be understood that, for the shape of the snap-fit member 2, the present disclosure is not specifically limited, as long as the snap-fit member 2 may be detachably snapped with the connecting member 5.

It should be understood that, in an example, a fixing plate 1, a plurality of pins 2, and a mounting plate 3 may be integrally formed. Of course, in other examples, a fixing plate 1, a plurality of pins 2, and a mounting plate 3 may also be mutually independent members, and the fixing plate 1, the plurality of pins 2, and the mounting plate 3 may be fixedly connected together.

When the mounting base 200 is mounted, according to an actual requirement, a plurality of pins 2 are fixed into the fixing plate 1, the plurality of connecting members 5 are in one-to-one correspondence with the plurality of pins 2, and the pins 2 are snapped in the connecting members 5, the mounting plate 3 is fixedly connected to the end of the fixing plate 1, and the mounting plate 3 is fixedly connected to the support; when the cat furniture item 300 needs to be fixed to the support, the cat furniture item 300 is fixed to the mounting base 200 by snapping the connecting members 5, fixedly connected to the cat furniture item 300, to the pins 2, that is, the cat furniture item 300 is fixed, through the mounting base 200, to the support, so that the cat furniture item 300 is prevented from being directly fixed to the support; when the cat furniture item 300 needs to be detached from the support, the cat furniture item 300 may be detached from the support by simply withdrawing the connecting members 5 from the pins 2, so that the cat furniture item 300 is effectively prevented from being damaged.

Figure 3:
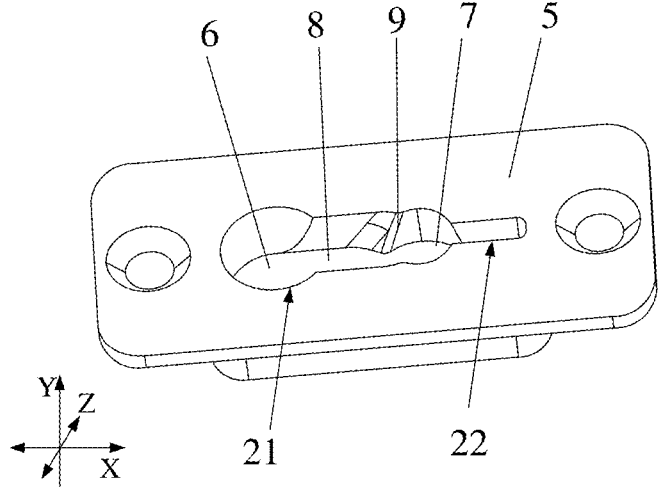
FIG. 3 is a schematic structural diagram of a connecting member of the mounting base for the cat furniture device of the embodiment shown in FIG. 1.

As shown in FIG. 2 and FIG. 3, in some examples, pins 2 are in an inverted cone shape, and have a gradually expanding diameter in a direction away from a fixing plate 1; a connecting member 5 is provided with a snapping slot 21, the snapping slot 21 is configured to enable a pin 2 to be snapped therein, and the snapping slot 21 includes a first circular slot section (also referred to as a circular slot) 6, a second circular slot section 7, and a transition channel section (also referred to as a transition channel) 8, the first circular slot section 6 and the second circular slot section 7 are connected through the transition channel section 8; the second circular slot section 7 is in an inverted cone shape, and has a gradually expanding diameter from a bottom thereof to a top thereof, and a diameter of the bottom of the second circular slot section 7 is less than a diameter of a top of a corresponding pin 2, a diameter of the top of the second circular slot section 7 is greater than the diameter of the top of the corresponding pin 2, the corresponding pin 2 is capable of being inserted into the first circular slot section 6, and the corresponding pin 2 is capable of moving, along the transition channel section 8, from the first circular slot section 6 to the second circular slot section 7, to be snapped with the second circular slot section 7, thereby achieving snap fit between the pin 2 and the connecting member 5.

In some examples, a diameter of a first circular slot section 6 is greater than a diameter of a top of a corresponding pin 2, so that the corresponding pin 2 is capable of being inserted into the first circular slot section 6.

In the embodiment, two side walls of a transition channel section 8 are obliquely arranged, so that a width of a bottom of the transition channel section 8 is less than a diameter of a top of a corresponding pin 2, and a width of a top of the transition channel section 8 is greater than the diameter of the top of the corresponding pin 2, so that a pin 2 may not disengage from the transition channel section 8 in a Z direction (a depth direction of a snapping slot 21) in the transition channel section 8. In the structure, a first circular slot section 6 and a second circular slot section 7 are connected through the transition channel section 8, and when the pin 2 is located in the first circular slot section 6, the pin 2 may slide, along the transition channel section 8, from the first circular slot section 6 to the second circular slot section 7.

As shown in FIG. 3, in some examples, a side wall of a snapping slot 21 is provided, at a joint of a second circular slot section 7 and a transition channel section 8, with a protruding portion 9 protruding towards an opposite side wall of the snapping slot 21, so that a width, at the joint, of the snapping slot 21 is less than a width of the second circular slot section 7 and a width of the transition channel section 8. The protruding portion 9 is adapted to be arranged obliquely along the transition channel section 8 and the second circular slot section 7. In an example, a width, at a top, of the protruding portion 9 is less than a diameter of a top of a corresponding pin 2, and a width of the protruding portion 9 at a bottom is less than the diameter of the top of the corresponding pin 2, so that an undesired sliding of the pin 2 along the X direction (a length direction of the snapping slot 21) is limited, so that a risk that a cat furniture item 300 falls off from a mounting base 200 is reduced or eliminated. In some examples, a protruding portion 9 may be provided individually or in pairs.

As shown in FIG. 3, in some examples, a protruding portion 9 has a rounded corner. The protruding portion 9, at a joint of a second circular slot section 7 and a transition channel section 8, has a rounded corner, facilitating a movement of a pin 2 from the transition channel section 8 into the second circular slot section 7, and an exit of the pin 2 from the second circular slot section 7 to the transition channel section 8.

As shown in FIG. 3, in some examples, a snapping slot 21 further includes an extension portion 22, and the extension portion 22 is located on a side, away from a transition channel section 8, of the second circular slot section 7. By means of the extension portion 22, a possibility of a deformation, in a Y direction (a width direction of the snapping slot 21), of a protruding portion 9 is increased, so that when a corresponding pin 2 passes through a joint, the protruding portion 9 is squeezed by the corresponding pin 2 and easily deformed, so that a pin 2 is allowed to pass therethrough, a possibility that the protruding portion 9 is worn is reduced, and service life of a connecting member 5 is increased.

Figure 4:
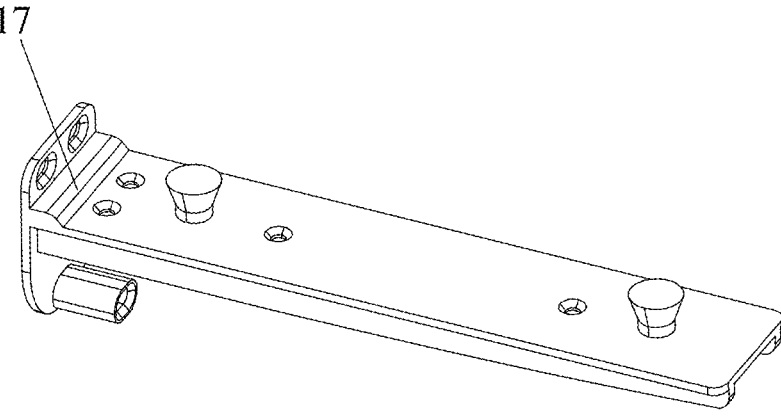
FIG. 4 is a schematic structural diagram of a fixing plate of the mounting base for the cat furniture device of the embodiment shown in FIG. 1.
Figure 5:
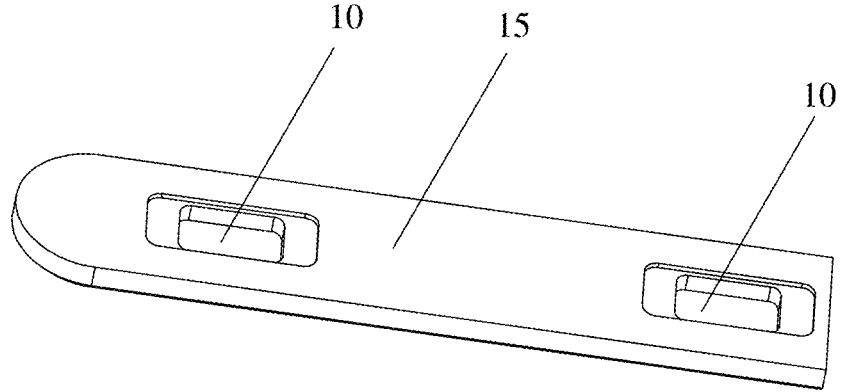
FIG. 5 is a schematic structural diagram of an upper cover plate of the mounting base for the cat furniture device of the embodiment shown in FIG. 1.

As shown in FIG. 4, in some examples, a fixing plate 1 is provided, on a side where a plurality of pins 2 are located, with an auxiliary ramp 17, the auxiliary ramp 17 is located at a joint of the fixing plate 1 and a mounting plate 3, and the auxiliary ramp 17 is configured to gradually rise towards the fixing plate 1. When cat furniture device 100 is mounted on a support, due to an effect of the auxiliary ramp 17, a connecting member 5, without being affected by an external force, is always in a state that a second circular slot section 7 of the connecting member 5 is snapped with a corresponding pin 2. That is, the auxiliary ramp 17 is beneficial to maintaining a snapping state, in a vertical direction, of the second circular slot section 7 and the corresponding pin 2.

Figure 6:
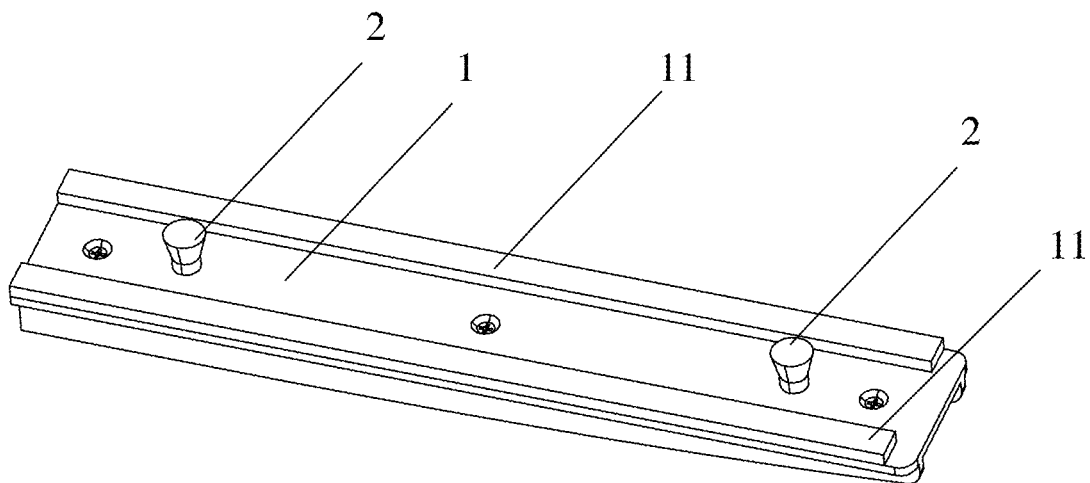
FIG. 6 is a schematic structural diagram of a fixing plate, viewed from top view, of the mounting base for the cat furniture device of the embodiment shown in FIG. 1.

As shown in FIG. 6, in some examples, a mounting base 200 provided further includes a pair of cushions 11, the pair of cushions 11 and a plurality of pins 2 are located on the same side of a fixing plate 1, the pair of cushions 11 are fixed to the fixing plate 1, and the pair of cushions 11 extend along a length direction of the fixing plate 1, and are arranged at intervals. The pair of cushions 11 may play a role in shading, beneficial to improving an aesthetic feeling.

As shown in FIG. 2, in some examples, a mounting plate 3 is provided with a plurality of oblong holes 13, and each oblong hole 13 is configured to allow a fastener to pass through, to fix the mounting plate 3 to a support. The mounting plate 3 is perpendicular to a fixing plate 1. In the structure, the mounting plate 3 may be fixed to the support through the oblong holes 13 with an expansion screw, so that the mounting plate 3 is firmly fixed, and the expansion screw of the oblong hole 13 may be adjusted on the oblong hole 13; and a position of the expansion screw is adjusted according to different cat furniture items, so that adaptability is higher.

The mounting plate 3 is substantially perpendicular to the fixing plate 1, so that the fixing plate 1 is substantially perpendicular to a surface of the support.

Figure 7:
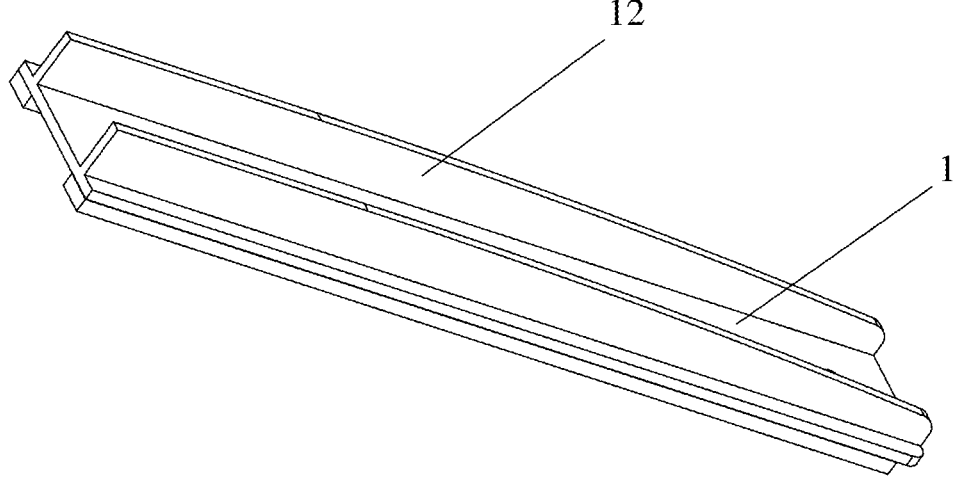
FIG. 7 is a schematic structural diagram of a fixing plate, viewed from bottom view, of the mounting base for the cat furniture device of the embodiment shown in FIG. 1.

As shown in FIG. 6 and FIG. 7, a mounting base 200 provided by the embodiment further includes a reinforcing rib 12, the reinforcing rib 12 is arranged on a side, facing away from a plurality of pins 2, of a fixing plate 1, and is fixed to the fixing plate 1. The reinforcing rib 12 is configured to ensure an overall strength of the fixing plate 1 and ensure a stability of the cat furniture item 300 fixed on the fixing plate 1. In some examples, a reinforcing rib 12 and a fixing plate 1 are integrally formed, or the reinforcing rib 12 and the fixing plate 1 are assembled together.

Figure 8:
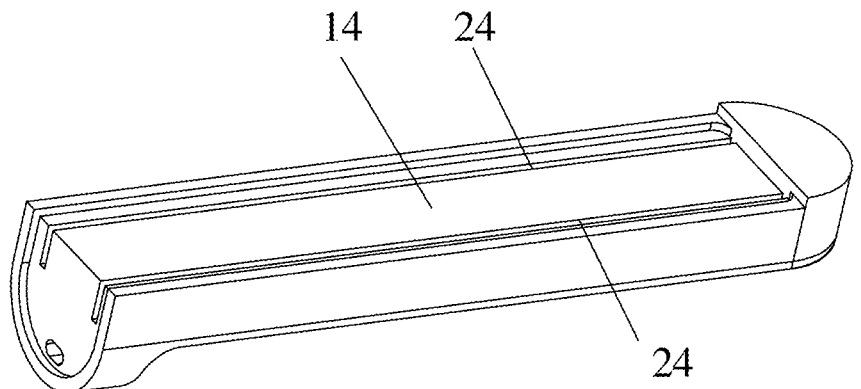
FIG. 8 is a schematic structural diagram of a lower cover plate of the mounting base for the cat furniture device of the embodiment shown in FIG. 1.

As shown in FIG. 2 and FIG. 8, in some examples, a mounting base 200 provided by the embodiment further includes a lower cover plate 14, the lower cover plate 14 is located on a side, facing away from a plurality of pins 2, of a fixing plate 1, and covers a side surface of the side, facing away from the plurality of pins 2, of the fixing plate 1. Further, the lower cover plate 14 is further provided with a receiving slot 24 corresponding to a reinforcing rib 12, and when the lower cover plate 14 is buckled on a lower side surface of the fixing plate 1, the reinforcing rib 12 is inserted into the receiving slot 24. The lower cover plate 14 may prevent the reinforcing rib 12 from being exposed, ensure an aesthetics of the cat furniture item 300, and prevent an exposed reinforcing rib 12 from causing a damage to a cat.

Figure 9:
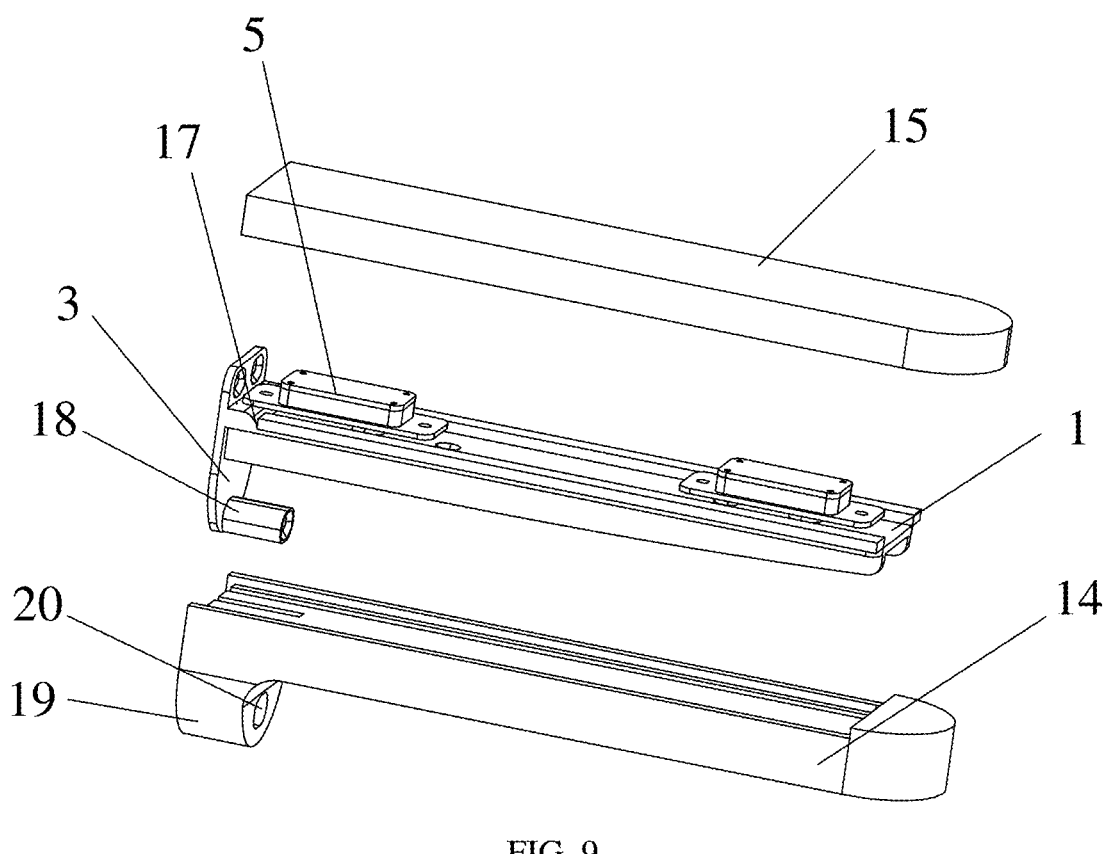
FIG. 9 is a schematic partial exploded diagram of the mounting base for the cat furniture device of the embodiment shown in FIG. 1.

As shown in FIG. 9, in some examples, a mounting base 200 provided by the embodiment further includes a hollow column 18 fixed to a mounting plate 3, the hollow column 18 is located on a side, facing away from a plurality of pins 2, of a fixing plate 1, and is located on a side, where the fixing plate 1 is located, of the mounting plate 3, a connecting portion 19 is disposed at an end of a lower cover plate 14, the connecting portion 19 is provided with a through hole 20, the hollow column 18 is configured to pass through the through hole 20, and is configured to allow a fastener (such as a screw), fixed to a support, to pass through, so that the lower cover plate 14 may be limited in a state of a stable connection with the fixed plate 1. When a screw is screwed into the support through the hollow column 18 and tightened, a head of the screw is against the hollow column 18, so that the mounting plate 3 (and the fixing plate 1) is firmly fixed on the support. In one example, an axial length of the hollow column 18 is less than an axial length of the through hole 20, so that the head of the screw is received within the through hole 20. The configuration facilitates an improvement of aesthetics and facilitates positioning of the screw.

As shown in FIG. 7, in some examples, a mounting base 200 provided by the embodiment further includes a reinforcing rib 12, the reinforcing rib 12 is arranged on a side, facing away from a plurality of pins 2, of a fixing plate 1, and is fixed to the fixing plate 1. The reinforcing rib 12 is configured to ensure an overall strength of the fixing plate 1 and ensure a stability of the cat furniture item 300 when fixed to the fixing plate 1. In some examples, a reinforcing rib 12 and a fixing plate 1 are integrally formed, or the reinforcing rib 12 and the fixing plate 1 are assembled together. A lower cover plate 14 is further provided with a receiving slot 24 matching a shape of the reinforcing rib 12, and the reinforcing rib 12 is inserted into the receiving slot 24, so that the lower cover plate 14 is better attached to the fixing plate 1, and an overall aesthetic effect is improved.

As shown in FIG. 2, in some examples, a mounting base 200 further includes an upper cover plate 15, a plurality of connecting members 5 are fixed to the upper cover plate 15, wherein the upper cover plate 15 is configured to be fixed to the cat furniture item 300, so that the plurality of connecting members 5 are fixed to the cat furniture item 300 by means of the upper cover plate 15.

As shown in FIG. 6, in some examples, an upper cover plate 15 is provided with a plurality of concave portions 10, and each connecting member 5 is embedded in a corresponding concave portion 10. In the structure, a connecting member 5 is embedded in a concave portion 10 of the upper cover plate 15, so that the connecting member 5 is prevented from being exposed, an aesthetics of the cat furniture item 300 is ensured, and an exposed connecting member 5 is prevented from causing a damage to a cat. In some examples, a connecting member 5 may alternatively be fixed, by welding, gluing, riveting, and the like, in a concave portion 10 of an upper cover plate 15.

Variant Example of Mounting Base

FIG. 10 to FIG. 15 show a configuration of a mounting base according to another embodiment of the present disclosure. The variant example is substantially the same as the above-described embodiments. In the variant example, the same or similar elements in the above embodiments are labeled with the same reference numerals to omit repeated description.

Figure 10:
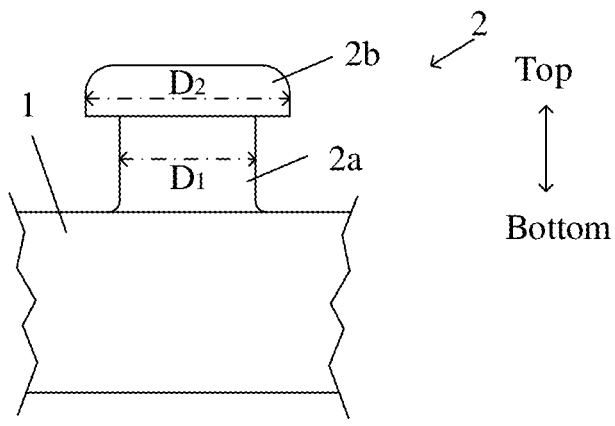
FIG. 10 is a schematic structural diagram of a pin according to another embodiment of the present disclosure.

Referring to FIG. 10, each pin 2 includes a small-diameter portion 2a and a large-diameter portion 2b, and the small-diameter portion 2a and the large-diameter portion 2b are sequentially arranged in a direction away from a fixing plate 1 (that is, a direction from a bottom of a pin to a top thereof). That is, the large-diameter portion 2b is located at a top end of the pin 2, and the small-diameter portion 2a is located between the large-diameter portion 2b and the fixing plate 1. A diameter D1 of the small-diameter portion 2a is less than a diameter D2 of the large-diameter portion 2b.

Referring to FIG. 11 to FIG. 14, a snapping slot 21 of a connecting member 5 includes a first circular slot section 6, a second circular slot section 7 and a transition channel section 8. The second circular slot section 7 includes a small-diameter segment 7a and a large-diameter segment 7b, the small-diameter segment 7a and the large-diameter segment 7b are sequentially arranged in a direction from a bottom of the second circular slot section 7 to a top of the second circular slot section 7 (that is, a direction from a connecting member plate 5 to a fixing plate 1). A diameter D3 of the small-diameter segment 7a is less than a diameter D4 of the large-diameter segment 7b.

A diameter $D_1$ of the small-diameter portion 2a is less than a diameter D3 of the small-diameter segment 7a, and a diameter $D_2$ of the large-diameter portion 2b is greater than the diameter D3 of the small-diameter segment 7a, and less than a diameter D4 of the large-diameter segment 7b. A pin 2 is capable of being inserted into the first circular slot section 6, and is capable of moving, along the transition channel section 8, from the first circular slot section 6 to the second circular slot section 7, to be snapped with the second circular slot section 7.

According to the configuration, the pin 2 is capable of being inserted into the first circular slot section 6, and then the pin 2 is moved, through the transition channel section 8, into the second circular slot section 7. Since the diameter $D_1$ of the small-diameter portion 2a of the second circular slot section 7 is less than the diameter D3 of the small-diameter segment 7a, and the diameter $D_2$ of the large-diameter portion 2b is greater than the diameter D3 of the small-diameter segment 7a, and less than the diameter D4 of the large-diameter segment 7b, the pin 2 may be snapped in the second circular slot section 7, so that the pin 2 is prevented from being separated, by moving in a direction away from the connecting member 5, from the second circular slot section 7.

Referring to FIG. 10 to FIG. 14, a diameter of a first circular slot section 6 is greater than a diameter of the large-diameter portion 2b, so that a pin 2 is capable of being inserted into the first circular slot section 6. In this way, the pin 2 is capable of being inserted into the first circular slot section 6.

Referring to FIG. 10 to FIG. 14, a transition channel section 8 includes a narrow segment 8a and a wide segment 8b, and the narrow segment 8a and the wide segment 8b are sequentially arranged in a direction from a bottom of the transition channel section 8 to a top thereof (that is, a direction from a connecting member plate 5 to a fixing plate 1). A width $W_1$ of the narrow segment 8a is less than a width $W_2$ of the wide segment 8*b*. A diameter $D_1$ of a small-diameter portion 2*a* is less than the width $W_1$ of the narrow segment 8*a*, and a diameter $D_2$ of a large-diameter portion 2*b* is greater than the width $W_1$ of the narrow segment 8*a*, and less than the width $W_2$ of the wide segment 8*b*. In this way, a pin 2 may be moved into a second circular slot section 7 through the transition channel section 8, and the pin 2 is prevented from being accidentally disengaged from the transition channel section 8, when moving in the transition channel section 8.

Figure 11:
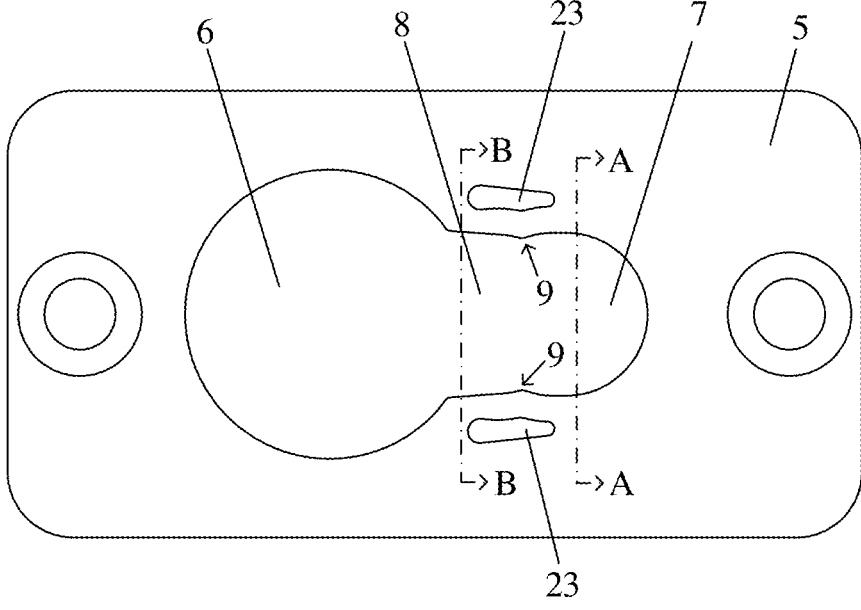
FIG. 11 is a schematic structural diagram of a connecting member according to another embodiment of the present disclosure.

Referring to FIG. 11, each connecting member 5 is further provided with a weakening portion 23, the number of the weakening portions 23 corresponds to the number of the protruding portions 9, and a depth of the weakening portion 23 corresponds to a depth of a snapping slot 21. The weakening portion 23 is a weakening slot or a weakening hole, wherein the weakening portion 23 is adjacent to the protruding portion 9, so that when a corresponding pin 2 passes through a joint, due to an existence of the weakening portion 23, stress generated by squeezing the protruding portion 9 by the corresponding pin 2 is reduced, so that the protruding portion 9 is easier to deform. Meanwhile, due to a stress counteracting effect of the weakening portion 23, a possibility of deformation of the protruding portion 9, of the connecting member 5 is reduced.

Figure 12:
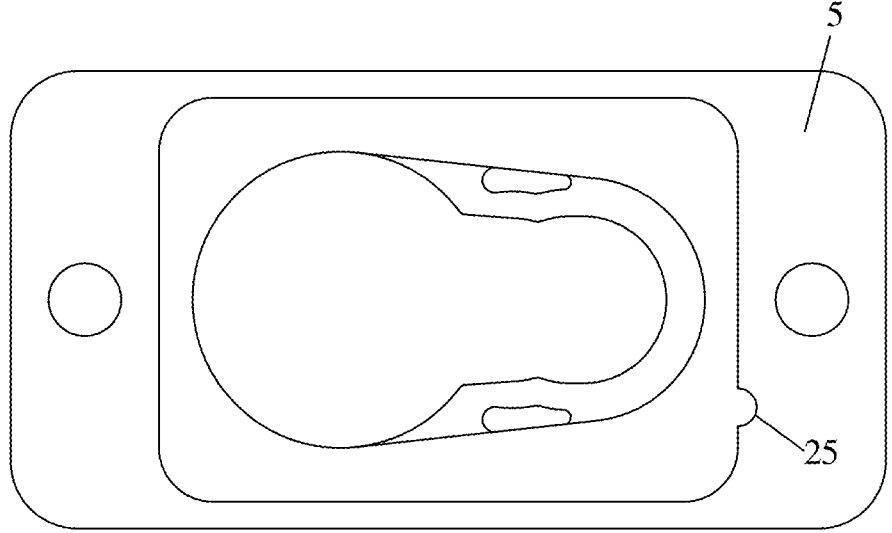
FIG. 12 is a schematic structural diagram of the connecting member, viewed from another view, in FIG. 11.
Figure 13:
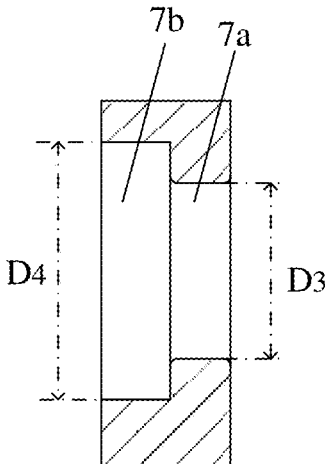
FIG. 13 is a cross-sectional view taken along A-A line in FIG. 11.
Figure 14:
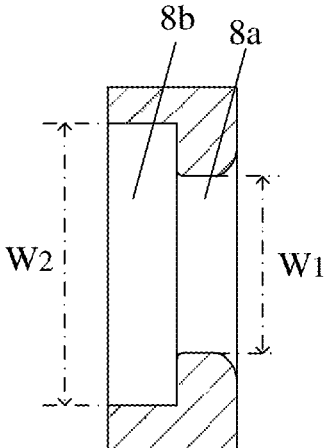
FIG. 14 is a cross-sectional view taken along B-B line in FIG. 11.

Referring to FIG. 12, a side, facing away from a fixing plate 1, of each connecting member 5 is further provided with a fool-proof convex portion 25, and a concave portion 10 of an upper cover plate 15 may be provided with a fool-proof concave portion (not shown). The fool-proof convex portion 25 is configured to fit with the fool-proof concave portion, so that after each connecting member 5 is mounted in a corresponding concave portion 10, the fool-proof convex portion 25 is placed in the fool-proof concave portion. In this way, each connecting member 5 may be ensured to be installed into the corresponding concave portion 10 in a correct way, so that, directions, from a first circular slot section 6 to a second circular slot section 7, of different connecting members 5 are ensured to be consistent.

Figure 15:
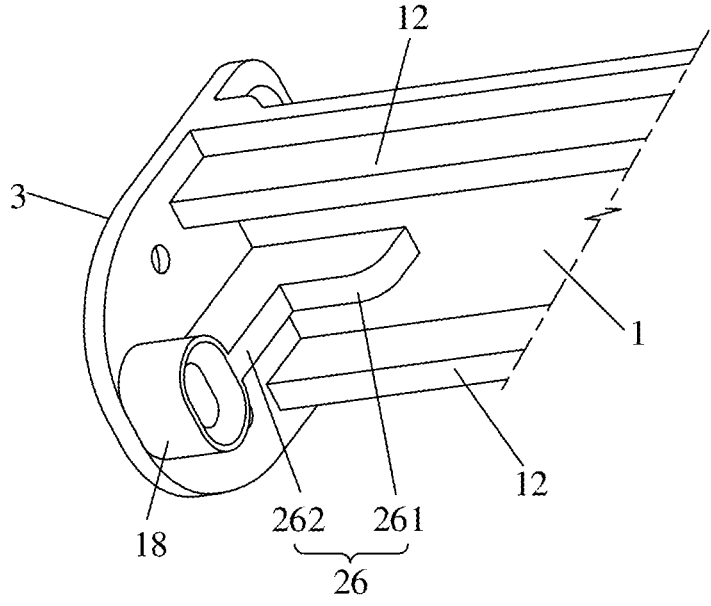
FIG. 15 is a schematic structural diagram of a fixing plate and a mounting plate according to another embodiment of the present disclosure.

Referring to FIG. 15, a mounting base further includes a support plate 26, the support plate 26 is located on a side, facing away from a plurality of pins 2, of a fixing plate 1, and is located at a corner of the fixing plate 1 and a mounting plate 3, and the support plate 26 includes a first support portion 261 and a second support portion 262. The first support portion 261 is fixed to the fixing plate 1, and is configured to extend, in a direction away from the mounting plate 3, from the mounting plate 3. The second support portion 262 is fixed to the mounting plate 3, and is configured to extend from the fixing plate 1 to a hollow column 18, and be fixed to the hollow column 18. In an example, a fixing plate 1, a mounting plate 3, a hollow column 18, and a support plate 26 are integrally formed.

The inventor found that a joint of a fixing plate 1 and a mounting plate 3 is prone to fracture failure. According to an above structure of the support plate 26, the support plate 26 may reinforce the joint of the fixing plate 1 and the mounting plate 3 by means of a structural strength of the hollow column 18, so that a risk of fracture failure easily occurring at the joint of the fixing plate 1 and the mounting plate 3 is effectively reduced.

Exemplary Cat Furniture Device

As shown in FIG. 2 and FIG. 16, the present embodiment provides a cat furniture device, including the cat furniture item 300 and a mounting base 200 as described in the foregoing embodiments, configured to fix the cat furniture item 300 to a support.

The cat furniture device is fixed to the support through the mounting base 200, the cat furniture device includes a panel 16, and a plurality of circular holes in one-to-one correspondence with pins 2 are disposed on the panel 16; the panel 16 is supported above a fixing plate 1, and the pins 2 pass through the circular holes, an upper cover plate 15 is buckled on the panel 16, and the pins 2 are snapped in connecting members 5. So that the panel 16 is fixed relative to the mounting base 200, wherein one panel 16 corresponds to two mounting bases 200.

The specific embodiments described herein are merely illustrative of the spirit of the present disclosure. A person skilled in the art may make various modifications or additions to the specific embodiments described or replace in a similar manner, but do not depart from the spirit of the present disclosure or beyond the scope defined by the appended claims.

What is claimed is:

1. A mounting base for fixing a cat furniture item to a support, the mounting base comprising:
   a fixing plate;
   a plurality of snap-fit members located on a side of the fixing plate and fixed to the fixing plate;
   a mounting plate located at an end of the fixing plate and fixed to the end of the fixing plate, wherein the mounting plate is configured to be fixed to the support;
   a plurality of connecting members, configured to be fixed to the cat furniture item, wherein the plurality of snap-fit members are a plurality of pins and configured to be detachably snapped with the plurality of connecting members respectively, so as to fix the cat furniture item to the mounting base;
   an auxiliary ramp, the fixing plate being provided with the auxiliary ramp on the side where the plurality of pins are located, the auxiliary ramp being located at a joint of the fixing plate and the mounting plate, and the auxiliary ramp being configured to gradually rise towards the fixing plate;
   a pair of cushions, the pair of cushions and the plurality of pins being located on the same side of the fixing plate, the plurality of pins being located between the pair of cushions, the pair of cushions being fixed to the fixing plate, the pair of cushions extending along a length direction of the fixing plate, and the pair of cushions being arranged at intervals;
   a lower cover plate, wherein the lower cover plate is located on the side of the fixing plate that is facing away from the plurality of pins, and the lower cover plate covers a side surface on the side of the fixing plate that is facing away from the plurality of pins; and
   a hollow column fixed to the mounting plate, wherein the hollow column is located on the side of the fixing plate that is facing away from the plurality of pins, and is located on a side of the mounting plate where the fixing plate is located; the lower cover plate is provided with a connecting portion at an end thereof, the connecting portion is provided with a through hole; the hollow column is configured to pass through the through hole, and is configured to allow a fastener, fixed to the support, to pass through.

2. The mounting base according to claim 1, wherein each pin comprises a small-diameter portion and a large-diameter portion, and the small-diameter portion and the large-diameter portion are sequentially arranged in a direction away from the fixing plate;
   each connecting member is provided with a snapping slot, and the snapping slot comprises a first circular slot section, a second circular slot section, and a transition channel section located between the first circular slot section and the second circular slot section;

the second circular slot section comprises a small-diameter segment and a large-diameter segment, and the small-diameter segment and the large-diameter segment are sequentially arranged in a direction from a bottom of the second circular slot section to a top of the second circular slot section;

a diameter of the small-diameter portion is less than a diameter of the small-diameter segment; a diameter of the large-diameter portion is greater than the diameter of the small-diameter segment, and less than a diameter of the large-diameter segment; and the corresponding pin is capable of being inserted into the first circular slot section, and is capable of moving, along the transition channel section, from the first circular slot section to the second circular slot section, so as to be snapped with the second circular slot section.

3. The mounting base according to claim 2, wherein a diameter of the first circular slot section is greater than the diameter of the large-diameter segment, so that the corresponding pin is capable of being inserted into the first circular slot section.

4. The mounting base according to claim 2, wherein the transition channel section comprises a narrow segment and a wide segment, the narrow segment and the wide segment are sequentially arranged in a direction from a bottom of the transition channel section to a top of the transition channel section; and the diameter of the small-diameter portion is less than a width of the narrow segment; the diameter of the large-diameter portion is greater than the width of the narrow segment, and less than a width of the wide segment.

5. The mounting base according to claim 2, wherein a side wall of the snapping slot is provided, at a joint between the second circular slot section and the transition channel section, with a protruding portion protruding towards an opposite side wall of the snapping slot, so that a width, at the joint, of the snapping slot is less than a width of the second circular slot section and a width of the transition channel section.

6. The mounting base according to claim 5, wherein each connecting member is further provided with a weakening portion, the weakening portion comprises a weakening slot or a weakening hole, and the weakening portion is adjacent to the protruding portion, so that when the corresponding pin passes through the joint, the protruding portion is easily deformed by being squeezed by the corresponding pin.

7. The mounting base according to claim 1, wherein the mounting plate is provided with a plurality of oblong holes, and each oblong hole is configured to allow a fastener to pass through to fix the mounting plate to the support.

8. The mounting base according to claim 1, wherein the mounting plate is substantially perpendicular to the fixing plate.

9. The mounting base according to claim 1, further comprising a reinforcing rib, wherein the reinforcing rib is arranged on a side of the fixing plate that is facing away from the plurality of pins, and is fixed to the fixing plate.

10. The mounting base according to claim 1, wherein the mounting base further comprises a support plate; the support plate is located on the side of the fixing plate that is facing away from the plurality of pins, and is located at a corner of the fixing plate and the mounting plate; and the support plate comprises a first support portion and a second support portion;

the first support portion is fixed to the fixing plate, and is configured to extend, in a direction away from the mounting plate, from the mounting plate; and the second support portion is fixed to the mounting plate, and is configured to extend from the fixing plate to the hollow column, and be fixed to the hollow column.

11. The mounting base according to claim 1, further comprising a reinforcing rib; wherein the reinforcing rib is arranged on the side of the fixing plate that is facing away from the plurality of pins, and is fixed to the fixing plate; the lower cover plate is further provided with a receiving slot matching a shape of the reinforcing rib, and the reinforcing rib is configured to be inserted into the receiving slot.

12. The mounting base according to claim 1, wherein the mounting base further comprises an upper cover plate, the plurality of connecting members are fixed to the upper cover plate, and the upper cover plate is configured to be fixed to the cat furniture item, so that the plurality of connecting members are fixed to the cat furniture item by means of the upper cover plate.

13. The mounting base according to claim 12, wherein the upper cover plate is provided with a plurality of concave portions, and each connecting member is embedded in a corresponding concave portion.

14. A cat furniture device, comprising:

a cat furniture item; and the mounting base according to claim 1, wherein the mounting base is configured to fix the cat furniture item to a support.

* * * * *